Patented Apr. 13, 1948

2,439,481

UNITED STATES PATENT OFFICE 2,439,481

PRESSURE-SENSITIVE ADHESIVE SHEET MATERIAL

John B. Martin, Glen Ellyn, Ill., assignor to The Kendall Company, Boston, Mass., a corporation of Massachusetts No Drawing. Application July 3, 1944, Serial No. 543,418

12 Claims. (Cl. 117—68.5)

This invention relates to pressure-sensitive adhesive sheet materials and more particularly to industrial adhesive tapes. The invention is concerned with tapes of this type which are commercially packaged in roll form and has for an object a treatment of the back surface of the tape to render it repellent to a pressure-sensitive adhesive applied to the face of the tape, in such manner that the composite material may be unrolled, or may be more readily unrolled, from roll form without detrimental delamination on either surface. A most important aspect of the invention is that satisfactory unrolling qualities are maintained despite storage of the tape in roll form for considerable periods of time between manufacture and use. The invention has particular advantages in the case of paper and Cellophane tapes.

The adhesion between the adhesive and the back surface of tapes of this invention is of such low magnitude that satisfactory unrolling characteristics can be secured when the adhesive mass is applied directly as a single layer coating to the face of the paper, Cellophane or other backing without the interposition of any primer coat or resort to other expedients for preferentially increasing the adhesion of the mass to the surface of the backing to which it is applied, over the normal adhesion which the mass exhibits to a like surface; and the low adhesion relation is of such permanence that initial satisfactory unrolling characteristics are adequately preserved over the periods of time demanded by commercial storage and transportation requirements.

Such materials as waxes and paraffins do not exhibit any permanent low level of adhesion towards common commercial pressure-sensitive rubber adhesives. If the back of an ordinary kraft paper sheet bearing an ordinary rubber pressure-sensitive adhesive on its face, is coated with wax or paraffin and the tape rolled upon itself, it very likely may be readily unrolled immediately; but, if the wax or paraffin is allowed to remain in contact with the adhesive for a day or two, unwinding difficulties in the form of delamination will be encountered that are fully as unacceptable as those encountered when the back treatment is omitted. This instability can be explained by the fact that waxes and paraffins are generally compatible with the rubber. Accordingly, they, or back coatings containing them, tend, over even short periods of time, to amalgamate or merge with the adhesive. There is thus a physical unification between the back and face surfaces. Additionally, the delamination may be the result of the waxes or paraffins actually migrating into the adhesive, and in the exercise of their known roles as modifiers and softeners for rubber adhesives changing the physical character of the adhesive. The cohesion of the adhesive is anyway reduced even to an extent that the adhesive becomes soft and mushy. The adhesive tack may also increase to a degree rendering the adhesive too sticky to unroll properly. The repellency of waxes and paraffins toward rubber is thus an initial and transitory repellency only, which breaks down under the test of commercial requirements.

This invention is based upon the discovery that a certain type of pressure-sensitive adhesive exhibits a markedly distinctive permanent low level of adhesion for a particular type of material, and lies in the utilization of that discovery by affixing that particular adhesion controlling material, or equivalents thereof, on the back surface of the tape backing, to the face of which the particular pressure-sensitive adhesive is applied.

The effectiveness of this low adhesion relation is so permanent in accomplishing the purposes of the invention that it alone may be relied upon to impart commercially satisfactory permanent unrolling qualities to a tape regardless of whether the backing is woven or unwoven fabric, other fibrous materials such as treated or untreated papers, including kraft and sulfite papers, parchment, or glassine, or even non-fibrous transparent or opaque smooth membranaceous sheet materials, such as Cellophane, or those formed from cellulose acetate, benzyl cellulose, ethyl cellulose, nitro-cellulose, polyvinyl chlorides or acetates, or copolymers thereof, other polyvinyl esters, polystyrene, vinylidine chloride, etc. Of course in the case of some of these backings, use of this invention may not be imperative to secure satisfactory unrolling, but its application may still be advantageous even in such cases if for no other purpose than to provide greater convenience and/or a greater margin of safety. In other cases, for instance, Cellophane or kraft paper, the invention is an effective way of securing permanently satisfactory unwinding qualities which cannot be secured if the particular adhesive and back surface treatment components of this invention are not both present.

For the purpose of the invention, it is immaterial whether the back surface treatment is carried out before or after application of the pressure-sensitive adhesive, although for purposes of commercial operation, repellent treatment prior to adhesive application is preferable.

The preferred back surface treatment material of this invention is magnesium stearate. This material can be cast in a continuous thin transparent film at room temperature from solution in an aromatic hydrocarbon such as xylene or toluene. I have successfully used a 10% solution in toluol applying the solution at room temperature to a flexible backing with a doctor blade or doctor roll to form a thin film of magnesium stearate having a thickness of the order of one-half mil (0.0005") or less. As applied, the film is transparent and adheres well to the paper, cloth and smooth surfaced backings previously described.

Where the backing material is porous or pervious to hydrocarbon solvents, there is danger that the back coat material will seep into the backing material to such an extent as to affect the other face of the backing and it may therefore be necessary to interpose a barrier coat. This is particularly true in the case of certain cloth fabrics and of certain unwoven webs. It is also true in the case of certain open kraft and other similar papers. On the other hand, in the case of membranaceous backings such as Cellophane, of very dense papers, or of other non-porous backings, the barrier coat is unnecessary. Where a barrier coat is desirable, shellac, proteins such as prolamine types of proteins derived from corn, water-laid glycerine-plasticized gelatine, nitrocellulose, cyclicized rubber or similar materials may be used.

Adhesives which may be utilized in the practice of this invention are those containing as an elastomer, polybutene either alone or in a mixed polymerizate. For use as an elastomer in adhesives, polybutene generally has a molecular weight of between 80,000 and 120,000 and it can be satisfactorily formulated into a practical pressure-sensitive adhesive by compounding it with polybutene of substantially less molecular weight (about 6,000) with or without compatible normally solid resins. A typical formula is:

| | Parts |
|---|---|
| Polybutene—mol. wt. 80,000 to 120,000 | 305 |
| Plasticizer (polybutene)—mol. wt. 6,000 | 295 |
| Normally solid resin | 120 |

Such an adhesive may be mixed with a solvent, such as benzene, and solvent coated on a paper backing such as 70# lard liner parchment or dense 40# brown kraft paper. Such dense kraft papers are made from overbeaten stock and are highly calendered.

Other plasticizers may be used, for instance mineral oil in accordance with the following formula:

| | Parts |
|---|---|
| Polybutene | 300 |
| Mineral oil | 150 |
| Normally solid resin | 240 |

While the inclusion of the normally solid resin is not essential, it is recommended, examples of satisfactory resins being a polymerized terpene resin hydrogenated glycerol abietate or cumarone-indene resin.

Furthermore, butyl rubber may be substituted for a part or whole of the polybutene either with or without a preliminary vulcanization of the butyl rubber. For instance, polybutene of 80,000 to 120,000 molecular weight and butyl rubber consisting of 95% polybutene and 5% isoprene, may be used in equal proportions, the butyl rubber being preliminarily vulcanized on a rubber mill with 5% tetra methyl thiuram disulfide or an equivalent amount of other vulcanizing agent.

The spreading operation may be performed with a doctor blade or roll, or in some cases may be spread without the use of volatile solvents, after formulation on a rubber mill, by a calendering operation.

Permanent repellency is found between adhesive and back surfaces in a tape having on one surface such a polybutene adhesive component and on the other surface such a magnesium stearate component, despite the fact that no such permanent repellency is found when the adhesive component is an ordinary natural or so-called crude rubber-resin pressure-sensitive adhesive. In the case of an ordinary commercial surgical type crude rubber-resin adhesive, paper or regenerated-cellulose-backed, tape, unrolling qualities, after an initial storage of a few days, is at best improved in small degree only in spite of the presence of the repellent component. In accelerated tests provided by storage in an oven at 105° F. for 24 hours, the maintenance of satisfactory unrolling qualities is found in a paper or regenerated cellulose backed tape bearing the polybutene adhesive and magnesium stearate repellent components of this invention, in decided contrast to disastrous delamination encountered in a tape identical except that it bears as its adhesive component an ordinary commercial crude rubber-resin pressure-sensitive adhesive.

The cause of such delamination in the one case becomes evident from comparative experimental demonstrations.

Pressure-sensitive adhesive Cellophane backed tapes having the magnesium stearate film of this invention were prepared and slit into strips of two-inch and one-inch width. There were also prepared one-inch width strips of Cellophane tape having, instead of the polybutene adhesive, an ordinary surgical type crude rubber-resin adhesive. Convenient lengths of the two-inch strips were affixed, tacky surface down, to rigid surfaces, such as phenol formaldehyde resin panels and a convenient length of each one-inch strip to be tested was then placed tacky surface down against the back of a two-inch strip under temperature conditions of 70° F., with its tacky surface contacting the magnesium stearate film of the two-inch strip. The rigid surface was then placed in a 15° inclined position and a 7 lb. roller, free to move vertically, was passed over the strip at the rate of 1 foot per minute up and back to adhere the pressure-sensitive surface to the magnesium stearate surface. One end of each one-inch strip was then attached to the clamp of a tensile strength Scott tester and the one-inch strip was separated from the two-inch strip at an approximate 180° angle and at a rate of one foot per minute.

The one-inch strips having both kinds of adhesive stripped cleanly from the underlying magnesium stearate surface, when tested immediately after application; neither adhesive lifted the magnesium stearate or left any residue on the magnesium stearate. However, when applied one-inch strips were stripped off in the same manner after intervening storage in applied form at 105° F. for 48 hours, portions of the magnesium stearate film which had been in contact with the rubber-resin type of adhesive lifted from the two-inch Cellophane strip and other portions of the magnesium stearate film not so lifted were noticeably softened; whereas in the case of the polybutene adhesive, the stripping was as clean as that secured before storage—there was no lifting of the magnesium stearate from the two-inch strip or softening thereof.

As a further comparative demonstration, the removed one-inch strips were affixed to glass surfaces and immediately stripped off the glass surfaces by the use of the technique previously described, except that in this test, the average number of pounds required to separate a substantial length of the one-inch tape from the glass surface at the approximate 180° angle and at the rate of one foot per minute was measured on the Scott tester to give the adhesion value between the pressure-sensitive adhesive and the glass surface. One such test showed that during the 48 hour period of contact of the pressure-sensitive adhesives with magnesium stearate films, the adhesion value of the rubber-resin type adhesive to glass had decreased about 37%, compared with its adhesion value to glass before storage; whereas in the case of the polybutene adhesive, the adhesion value to glass had actually increased by a differential within experimental error.

Another investigation which quantitatively demonstrates, at least in a general way, the impermanence in the adhesion relation between commercial rubber-resin adhesives and the magnesium stearate in contrast to the markedly different permanence in the adhesion relation existing between adhesive components utilized in accordance with this invention and magnesium stearate involves comparatively measuring the adhesion values between the respective adhesives and magnesium stearate coatings at fixed time intervals. Adhesion values were obtained both immediately upon application of the adhesive tapes to the magnesium stearate and 48 hours after application. In each case, adhesion values obtained after the 48 hour interval were higher than those obtained immediately upon application, but the rate of adhesion value increase in the case of the tapes having the adhesive component of this invention was only from an average of 29 oz. per inch width to an average of 37 oz. per inch width, in contrast to an increase in a like test on tapes having the rubber-resin adhesive component from an average of 13 oz. per inch width to an average of 40 oz. per inch width, over the 48 hour period. Thus the amount of increase in 48 hours was, in the case of the combination of this invention, of the order of less than 50% as against an increase of about 300% in the case of the crude rubber adhesive. While our experience in the case of either of these adhesives indicates that adhesion values increase a certain extent during a period of contact with any surface, the percentage increase in the case of the rubber-resin adhesive component contacting magnesium stearate is so in excess of the normal percentage increase, and the percentage increase in the case of the polybutene adhesive component is so near the normal increase that a different interaction is indicated depending upon the adhesive.

All of these investigations substantiate the different interaction between the pressure-sensitive adhesives and magnesium stearate films apparent on inspection. In the case of a repellent component of this invention being used in combination with an ordinary rubber-resin type adhesive component, there is such interface interaction—intersolubility, chemical reactivity, migration, or other interflow, molecular or otherwise—as to produce eventual delamination on unrolling; whereas in the case of a repellent component of this invention being used in combination with an adhesive component of this invention, there is a lack, certainly to a substantial degree, of these interactions. These detrimental interactions occur not only when a repellent component of this invention is used in combination with an adhesive component not contemplated as proper within the scope of this invention, but also when an adhesive component of this invention is used with a back coat component not contemplated as proper within the scope of this invention.

Preferred combinations of adhesive and back coat components of this invention thus have the unique relation of evidencing, when in contact over periods of time exceeding 24 hours, such lack of migratory interpenetration and amalgamation that ready separation may be accomplished; the character of the adhesive mass with respect to adhesion to external surfaces has not materially varied; and the inter-adhesion values between adhesive mass and backing do not show any such abnormally rapid rate of increase that the value will reach levels, during commercial time intervals between manufacture and use, which so exceed any one of the values (a) Adhesion of the repellent coat to the backing
(b) Adhesion of the adhesive to the backing
(c) Internal strength of the repellent coat
(d) Internal strength of the adhesive coat that the tap will delaminate, the quantitative interadhesion values usually remaining in ranges below the least of these other values.

Polybutene adhesives of the specific character hereinbefore designated, wherein the polybutene exists or acts as the continuous phase of the adhesive, have been found to perform in the above manner against magnesium stearate repellent coats, and are therefore the preferred form of adhesive component for use in the practice of this invention. It is contemplated, however, that the favorable polybutene characteristics of the adhesive component toward a repellent coat component as herein contemplated may be maintained within the above given requirements even in the presence of other modifiers, plasticizers and/or even small quantities of other elastomers. So far as such modification is concerned, from our experience, usual quantities of ordinary rosin or resins, plasticizers or other modifiers which might be used, perhaps less advantageously, in the preparation of pressure-sensitive polybutene adhesives, do not deprive a tape made in accordance with this invention of repellent benefits as herein described, between back coat and adhesive or violate the above given requirements.

The efficacy of magnesium stearate in the practice of this invention has also led to successful treatment of the backing with other materials, such as other water-insoluble metallic salts of fatty acids and fatty acid amides. Stearamide can be utilized in the same manner as magnesium stearate, being applied in a hydrocarbon solvent. Some of the saturated fatty acid metallic salts such as magnesium palmitate are not as commercially available as the stearate. Zinc stearate exhibits the desirable kind of permancy of repellency towards polybutene adhesives, but, unlike magnesium stearate, zinc stearate cannot be satisfactorily cast into a continuous film from a cold solution. Apparently it crystallizes out on deposition and continuity can be secured only by melting the deposit after application. Since such a melting step is unnecessary in the case of magnesium stearate, the latter has a marked advantage over zinc stearate. Calcium stearate cannot be readily spread into a continuous film by either solvents or calendering. Other of the water-insoluble metallic salts show similar mechanical deficiencies which prevent successful results following cold application. However, one may resort to film-forming vehicles to carry the repellent material or to adjust their viscosities for spreading. For instance, aluminum palmitate can be laid down in a nitro-cellulose coating, or zinc stearate in cyclicized rubber, polyvinyl alcohol or gelatin. Other vehicles might be cellulose acetate, ethyl cellulose, zein, glyadin (wheat protein), or starch.

None the less, aside from their more complicated or less reliable casting qualities, all these other materials are of use for accomplishing the purposes of this invention.

It is contemplated that repellent coat and adhesive components of this invention can be applied by calendering operations in lieu of solvent-spreading.

I claim:

1. A pressure-sensitive adhesive sheet material comprising a flexible sheet backing, an exposed coating of a normally tacky pressure-sensitive polybutene adhesive adherently affixed to one side of said backing and a substance, selected from the group consisting of water-insoluble metallic salts and amides of a saturated fatty acid selected from the group consisting of stearic and palmitic acids, repellent to said polybutene adhesive adherently affixed to the other side of said backing in a thin continuous dry film.

2. A pressure-sensitive adhesive sheet material as claimed in claim 1, wherein the sheet backing is a flexible non-fibrous membranaceous sheet material.

3. A pressure-sensitive adhesive sheet material comprising a flexible sheet backing, an exposed coating of a normally tacky pressure-sensitive polybutene adhesive adherently affixed to one side of said backing and a water-insoluble metallic salt of a saturated fatty acid selected from the group consisting of stearic and palmitic acids repellent to said polybutene adhesive adherently affixed to the other side of said backing in a thin continuous dry film.

4. A pressure-sensitive adhesive sheet material as claimed in claim 3 wherein the saturated fatty acid salt is a water-insoluble metallic stearate.

5. A pressure-sensitive adhesive sheet material as claimed in claim 3 wherein the water-insoluble metallic salt of a saturated fatty acid is magnesium stearate.

6. A pressure-sensitive adhesive sheet material comprising a sheet of regenerated cellulose, an exposed coating of a normally tacky pressure-sensitive polybutene adhesive adherently affixed to one side of said sheet of regenerated cellulose and a water-insoluble metallic stearate repellent to said polybutene adhesive adherently affixed to the other side of said sheet in a thin continous dry film.

7. A pressure-sensitive adhesive sheet material comprising a flexible relatively permeable sheet backing, an exposed coating of a normally tacky pressure-sensitive polybutene adhesive adherently affixed to one side of said backing, a relatively impervious barrier layer resistant to penetration by solvents adherently affixed to the other side of said backing, and a substance, selected from the group consisting of water-insoluble metallic salts and amides of a saturated fatty acid selected from the group consisting of stearic and palmitic acids, repellent to said polybutene adhesive adherently superposed on said barrier layer in a thin continuous dry film.

8. A pressure-sensitive adhesive sheet material comprising a flexible sheet backing, an exposed coating of a normally tacky pressure-sensitive polybutene adhesive adherently affixed to one side of said backing and magnesium stearate affixed in dry adherence to the other side of said backing.

9. A transparent pressure-sensitive adhesive sheet material comprising a transparent flexible non-fibrous membranaceous sheet material, a transparent layer of a normally tacky pressure-sensitive polybutene adhesive firmly adherent to one side of said non-fibrous sheet, and a thin continuous transparent dry film of magnesium stearate repellent to said polybutene adhesive adherently affixed to the other side of said non-fibrous sheet.

10. A pressure-sensitive adhesive sheet material comprising a sheet of regenerated cellulose, a firmly adherent layer of a normally tacky pressure-sensitive polybutene adhesive affixed directly to one side of said cellulose sheet, and a thin continuous firmly adherent dry film of magnesium stearate affixed directly to the other side of said cellulose sheet.

11. A pressure-sensitive adhesive sheet material comprising a sheet of paper, an exposed coating of a normally tacky pressure-sensitive polybutene adhesive adherently affixed to one side of said paper sheet, and a water-insoluble metallic stearate repellent to said polybutene adhesive adherently affixed to the other side of said paper sheet in a thin continuous dry film.

12. A pressure-sensitive adhesive sheet material comprising a sheet of parchment, an exposed coating of a normally tacky pressure-sensitive polybutene adhesive adherently affixed to one side of said parchment sheet, and a water-insoluble metallic stearate repellent to said polybutene adhesive adherently affixed to the other side of said sheet in a thin continuous dry film.

JOHN B. MARTIN.

REFERENCES CITED

The following references are of record in the file of this patent:

UNITED STATES PATENTS

| Number | Name | Date |
| --- | --- | --- |
| 2,257,167 | Gerhardt et al. | Sept. 30, 1941 |
| 2,258,434 | Abrams et al. | Oct. 7, 1941 |
| 2,313,703 | Hanna | Mar. 9, 1943 |
| 2,334,585 | Schieman | Nov. 16, 1943 |
| 2,358,761 | Reed | Sept. 19, 1944 |
| 2,358,831 | Schieman | Sept. 26, 1944 |